United States Patent
Zoppas

(10) Patent No.: US 7,021,921 B2
(45) Date of Patent: Apr. 4, 2006

(54) PICK-UP PLUG FOR PLASTIC PREFORMS

(75) Inventor: Matteo Zoppas, Pordenone (IT)

(73) Assignee: SIPA S.p.A., Treviso (IT)

( * ) Notice: Subject to any disclaimer, the term of this patent is extended or adjusted under 35 U.S.C. 154(b) by 203 days.

(21) Appl. No.: 10/416,003

(22) PCT Filed: Oct. 11, 2001

(86) PCT No.: PCT/EP01/11748

§ 371 (c)(1),
(2), (4) Date: Sep. 8, 2003

(87) PCT Pub. No.: WO02/38353

PCT Pub. Date: May 16, 2002

(65) Prior Publication Data

US 2004/0047940 A1 Mar. 11, 2004

(30) Foreign Application Priority Data

Nov. 7, 2000 (IT) .......................... PN20000037 U

(51) Int. Cl.
*B65G 47/90* (2006.01)

(52) U.S. Cl. .................................. 425/534; 198/803.7

(58) Field of Classification Search ................ 425/534; 198/803.7
See application file for complete search history.

(56) References Cited

U.S. PATENT DOCUMENTS

| | | | |
|---|---|---|---|
| 4,199,183 A | 4/1980 | Hecker | |
| 4,483,436 A | 11/1984 | Krishnakumar et al. | |
| 4,487,568 A | 12/1984 | Wiatt et al. | |
| 4,536,150 A | 8/1985 | Smith | |
| 4,684,012 A * | 8/1987 | Feddersen | 198/867.05 |
| 4,890,726 A * | 1/1990 | Wissmann | 198/803.12 |
| 5,769,476 A * | 6/1998 | Lawn et al. | 294/99.1 |
| 6,106,273 A * | 8/2000 | O'Dell | 425/534 |

* cited by examiner

*Primary Examiner*—Robert B. Davis
(74) *Attorney, Agent, or Firm*—Wenderoth, Lind & Ponack, L.L.P.

(57) ABSTRACT

A pick-up plug for supporting and transporting preforms of thermoplastic resin, includes a central body, and an engagement mechanism adapted to slip into the neck portion of the preform, in which elastic members are provided on the engagement mechanism so as to press them against the wall of the neck portion, wherein a central body is provided with at least three groove-like recesses opening towards the exterior and the engagement mechanism is constituted by individual and independent gripping members that are housed in respective ones of the groove-like recesses. The elastic members are constituted by respective preloaded springs acting between the inner wall of each groove-like recess and the inner wall of the respective individual gripping member. The groove-like recesses are provided with a respective niche adapted to be engaged by a terminal portion of a respective one of the individual and independent gripping members, so that the latter are capable of rotating with the respective terminal portion pivotally retained in the respective one of the niches.

10 Claims, 9 Drawing Sheets

PICK-UP PLUG FOR PLASTIC PREFORMS

BACKGROUND OF THE INVENTION

The present invention relates to a particular kind of pick-up plugs, i.e., devices which are adapted to engage respective plastic preforms in view of supporting, orienting and carrying the preforms throughout the various steps which the preforms themselves go through for further processing, and in particular, during the phases of temperature conditioning and blow molding.

The term "pickup plug" is a term taken from the technical parlance that is commonly used, where other terms such as "tournette", "mandrel", "preform holder", "carrier" are also used to identify the same device.

Therefore, the use of the term "pick-up plug" in this context should not create any difficulty or confusion to those skilled in the art.

The task that a pick-up plug is required to perform lies in engaging a respective preform by being inserted therein, and then supporting the preform, carrying the preform through various processing steps, and finally releasing the preform at the end of a processing cycle, by slipping off of the preform.

When chains of pick-up plugs are used in blow-molding installations, the number of such pick-up plugs is generally very large and this imposes, for obvious reasons of costs and reliability, as simple a construction as possible.

Pick-up plugs can be subdivided into two main categories, i.e., inner-engagement devices and outer-engagement devices.

Pick-up plugs for inner engagement work by being inserted in the neck portion of the preform, whereas pick-up plugs for outer engagement work by letting the neck portion of the preform into a portion thereof.

Generally speaking, the use of such pick-up plugs is connected with the following problems and drawbacks:

the neck portions of the individual portions are actually variable in their size and quite often exceed the specified dimensional tolerance limits;

an insertion of pick-up plugs in preforms that are too small, out of tolerance or at the limit thereof, proves quite difficult, if not almost impossible to be carried out, since this would require a lot of strain with the risk of the preform breaking down; and preforms that are too large, out of tolerance or at the limit thereof, fall off during their transport.

These problems and drawnbacks create real risks of shutdowns, and related downtimes, of the entire production plant, with serious and easily imaginable economic consequences.

Pick-up plugs are known in the art which are provided with an annular spring that is intended to ensure a firm grip of the preforms by slipping thereinto, wherein such springs may be formed in a toroidal or a cylindrical shape.

These pick-up plugs, however, have the following drawbacks:

the gripping force, i.e., the effect exerted by the spring depends to a considerable extent on the actual diameter of the preform; in fact, it may quite easily occur that such effect changes all too quickly from a condition of an inadequate or even non-existing grip in the case of a perform that is too large, to a condition of an excessively strong grip which results in a stoppage due to jamming, in the case of a preform that is too small; and in the case of such a jamming or stoppage situation, considerable axial insertion or disengagement thrust pushes the annular spring against the edges of the related housing, thereby increasing the force of friction opposing the contraction thereof (which would in fact enable the preform to move).

A penalty could furthermore be imposed by an effect deriving from the arc of the annular spring being squeezed, as is illustrated schematically in FIG. 1.

Devices based on the use of such annular springs, owing to the inherent nature thereof, do not allow for their axis to be maintained in position in an adequately accurate manner (the ring tends to move and get displaced in its housing) and, during the passage through conditioning ovens, the preforms rotate about an off-centre axis; and this of course causes the preforms to undergo a non-symmetric heating effect.

All of the above cited drawbacks refer to pick-up plugs for inner engagement of the preforms. In the case of pick-up plugs intended for outer engagement of the preforms, similar drawbacks are experienced, which should however be described in a reverse manner, owing to the different and symmetrical coupling intervening between an outer-engagement pick-up plug and the preform. However, since such a description is perfectly and readily imaginable by all those skilled in the art, it is intentionally omitted here for reasons of greater brevity.

Inner-engagement pick-up plugs that make use of rings made of elastic polymeric material are also well known in the art; and although these pick-up plugs actually seem effective in reducing or doing away with some of the above cited drawbacks, they still have a number of other drawbacks that may be summarized as follows:

difficulty in obtaining a stable, constant quality, as well as adjus bent and sizing difficulties;

sensitiveness of the polymeric material to the heat developed in conditioning ovens, resulting in a quick deterioration of the quality and the performance 10 capabilities thereof; and a need for an additional mechanical function to be provided to ensure compression and decompression of the annular elastomeric joint.

Also known in the art, e.g., from the disclosure in U.S. Pat. No. 4,678,425 in the name of Cincinnati Milacron Inc., there are pick-up plugs in which the function of engaging the respective preform is assigned to a cylindrical elastic portion of the pick-up plug to be inserted in the preform, as well as to an appropriate annular protuberance (bulge 70) provided on the elastic portion. However, this solution has some serious drawbacks, such as in the first place the utmost rigidity (in the sense of aptitude to comply) with respect to even very small variations in the inside diameter of the neck portion of the preform.

In conclusion, currently employed pick-up plugs prove quite difficult to adjust and scarcely adaptable to the dimensional variations of the preforms; and as a result, they give rise to reductions in the industrial efficiencies of the production plants using them, owing to frequent accidents occurring in the insertion or release of the preforms, or even during the transport thereof.

Moreover, the need arises for all pick-up plugs in a plant to be duly replaced whenever the type of preforms being processed is going to be changed, regardless of such preforms being more or less dimensionally similar to the previously processed ones.

SUMMARY OF THE INVENTION

Based on the above considerations, it is therefore desirable, and it is actually a main purpose of the present invention, to provide pick-up plugs, both of the inner-engagement and outer-engagement type, of a kind that is capable of automatically minimizing or doing away with the above mentioned drawbacks.

Furthermore, such pick-up plugs shall be capable of being easily implemented using readily available and, therefore, cost-effective materials and techniques.

Such an aim of the present invention, along with further features thereof, is accomplished in pick-up plugs of a kind that are made and operated as recited in the appended claims.

BRIEF DESCRIPTION OF THE DRAWINGS

The present invention may take the form of a preferred, although not sole embodiment such as the one that is described in detail and illustrated below by way of a non-limiting example with reference to the accompanying drawings, in which:

FIG. 4b is a cross-section view, orthogonally to the axis thereof, of the 5 component part illustrated in FIG. 4a;

DETAILED DESCRIPTION OF THE INVENTION

Figure 1:
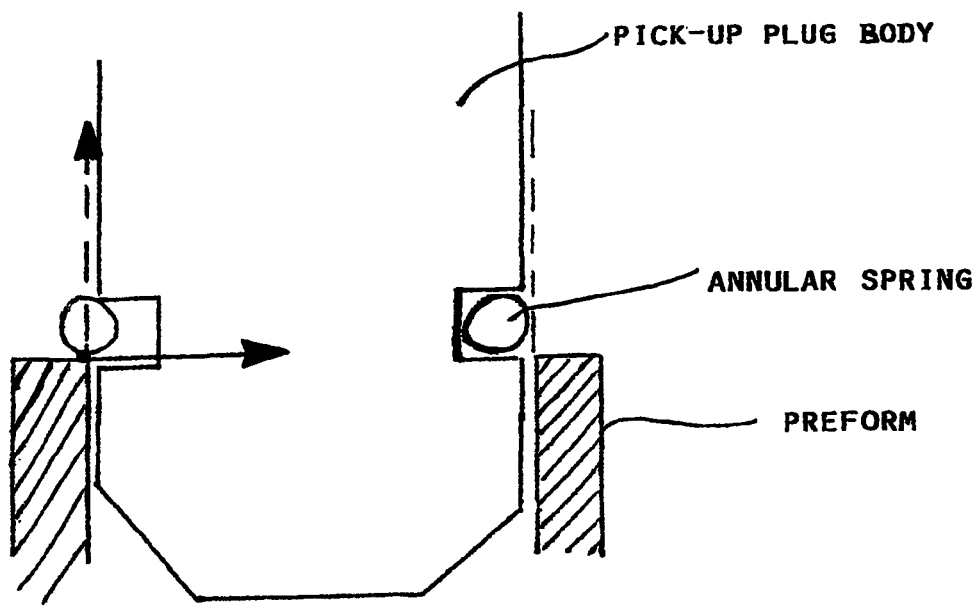
FIG. 1 is an illustration of a pick-up plug according to the present invention.

With reference to the above listed Figures, an inner-engagement type pick-up plug according to the present invention comprises a central body 1, on the outer cylindrical surface of which there are provided a plurality of groove-like recesses 2 that open radially outwards.

In each one of these groove-like recesses 2 there is arranged a respective individual and independent gripping member 3 adapted to protrude outwards from the cylindrical surface of the central body 1.

In order to ensure that the gripping members 3 are all able to at the same time expand radially outwards, thereby engaging the inner surface of the preform, each one of such gripping members 3 is forced and pressed outwardly by a respective spring 4 that is provided in the gap existing between the inner wall 5 of each such gripping member 3 and the face 6 looking towards the outside of the respective groove-like recess 2. As a result, each such groove-like recess 2 holds both a respective gripping member 3 and the related spring 4.

Figure 2A:
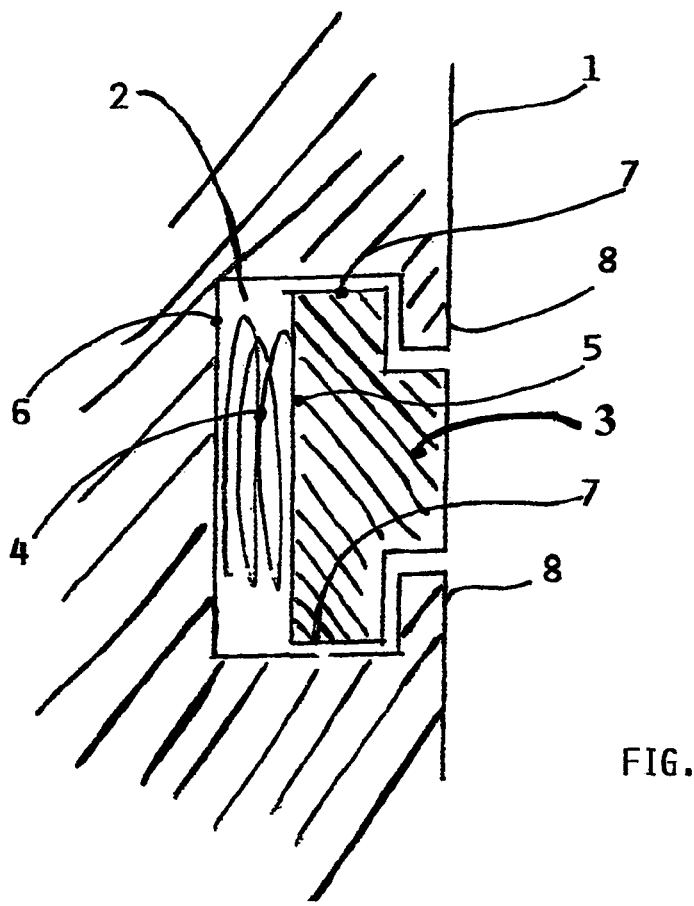
FIG. 2a is a median-section view of a portion of the pick-up plug illustrated 25 in FIG. 1.
Figure 2B:
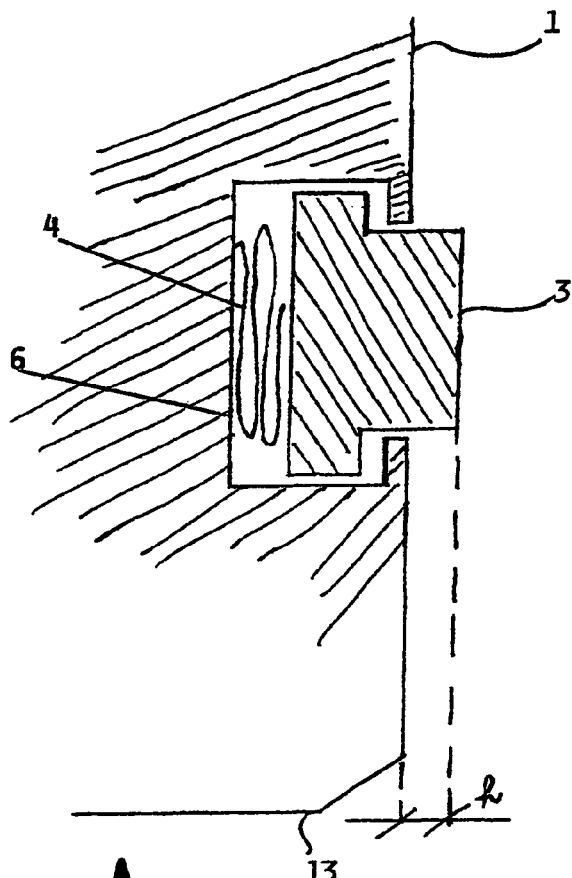
FIG. 2b is a view of the portion of pick-up plug illustrated in FIG. 2a, in a particular condition and posit on thereof.
Figure 2C:
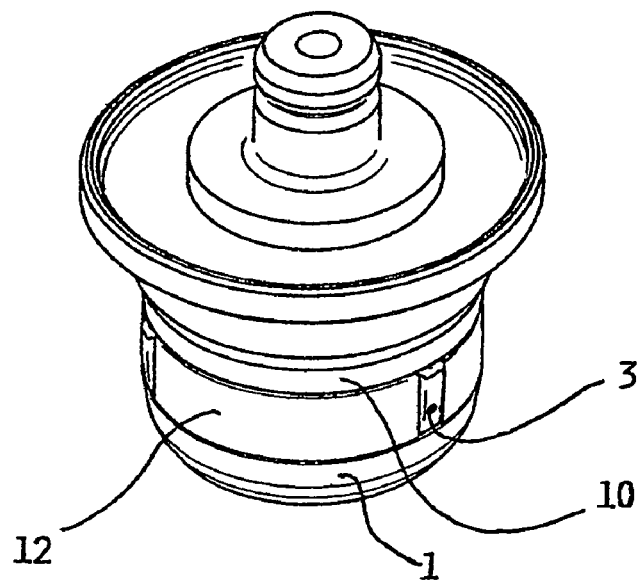
FIG. 2c is an inclined outer perspective view of a pick-up plug generally according to the present invention.

As illustrated in FIGS. 2c and 2b, the simplest possible embodiment involves a pick-up plug, in which on the edges of the groove-like recesses 2 there are provided appropriate prominences 7, and the related gripping member 3 is provided with corresponding appendices 8 in such a manner as to make it possible for the prominences 7 and the appendices 8 to engage each other under the action of the spring 4, wherein the gripping members 3 are at the same time retained and prevented from disengaging by the respective groove-like recess 2.

Through an appropriate sizing of the various parts involved in relation to each other, the possibility is provided for a pick-up plug to be provided, in which the engagement means enable the pick-up plug to be inserted under the action of just a small insertion force, even if the preforms to be so inserted may actually have some slight variations, i.e., tolerances in the inside diameter thereof.

However, this solution still retains two of the afore described drawbacks, i.e.:

a) the strain involved in the insertion of the preform may still prove quite considerable in the case of preforms with a reduced diameter, whereas when the same preforms must then be released, i.e., removed therefrom, it is highly desirable that the ejection strain be as low as possible, and that the preforms are prevented from releasing and falling off accidentally, which might for instance occur due to vibrations or abrupt changes in the orientation thereof. These are quite obviously mutually contrasting requirements and the proposed solution does not solve such a contradiction;

b) when preforms having different inside diameters are processed, in order to allow for and take the largest inside diameter into due account, the need arises for the gripping member 3 to protrude by a distance h (see FIG. 2b), which may actually prove excessive when preforms with a minimum diameter (as referred of course to the diameter of the body of the pick-up plug) are handled, owing to the considerable interference that would derive therefrom. Under such circumstances, the need would therefore still arise for the pick-up plugs to be replaced each time with correspondingly sized plugs and this would in turn force the entire plant to be shut down and, as a result, be quite a heavy penalty on the overall productivity and efficiency thereof.

Figure 3:
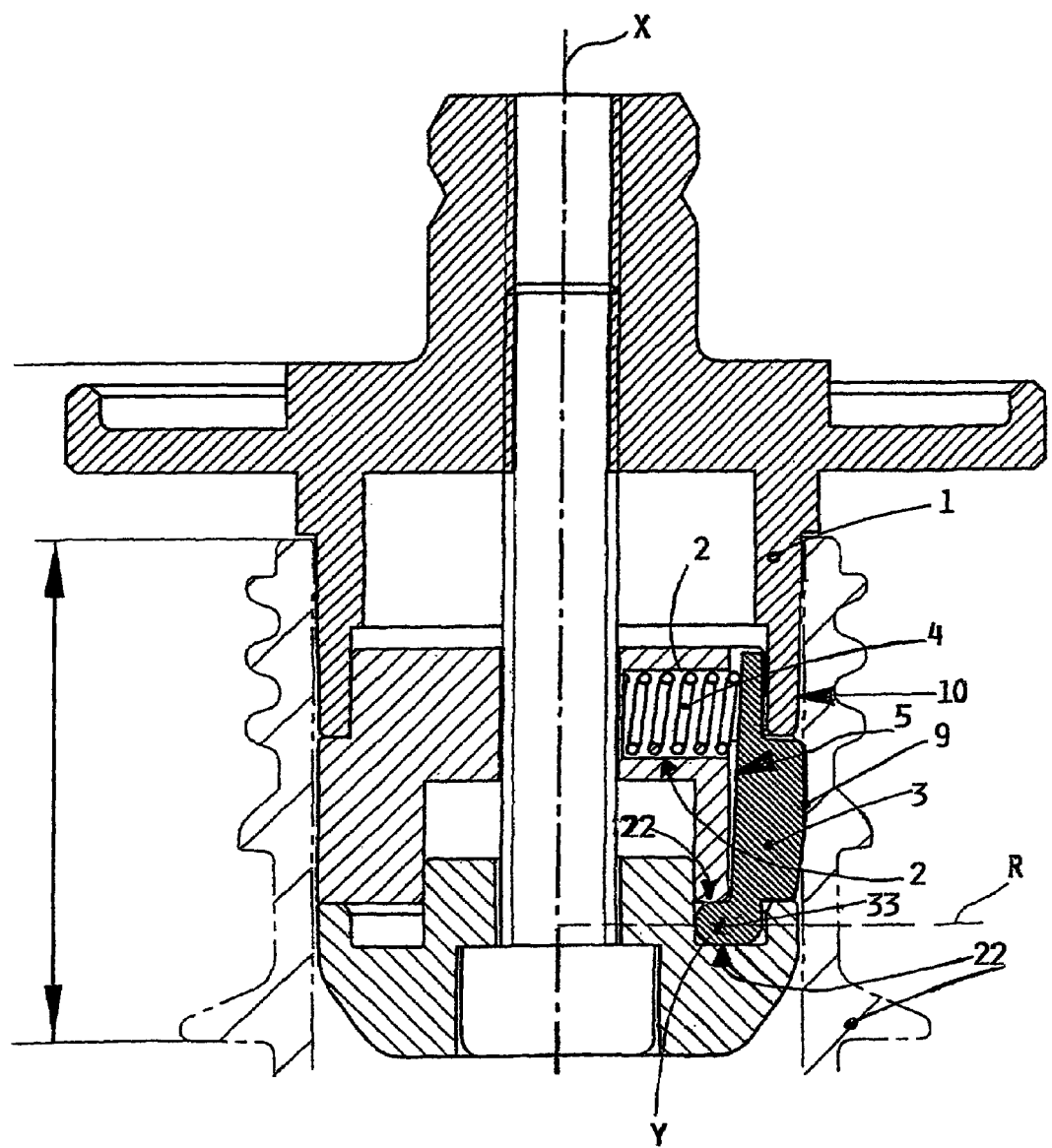
FIG. 3 is a median-section view of a pick-up plug according to an improvement of the present invention.
Figure 4A:
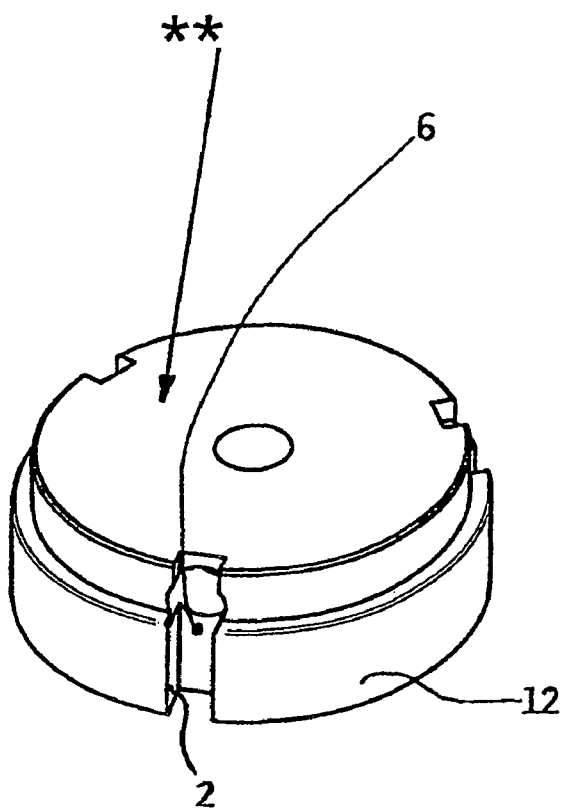
FIG. 4a is a perspective view of a component part of the pick-up plug illustrated in FIG. 3.
Figure 4B:
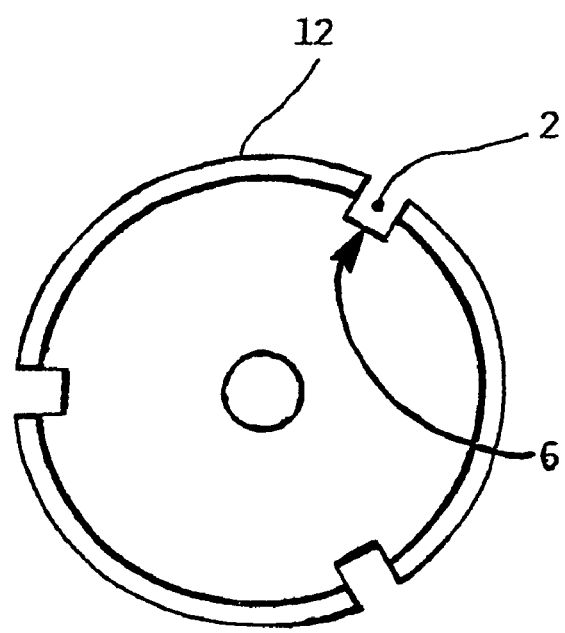

For the purpose of doing away with such drawbacks, the following described improvement is therefore adopted. With reference to FIGS. 3, 4a and 4b, the groove-like recess 2 are provided with a niche 22 at an extremity thereof, which preferably is the extremity oriented towards the edge 13 of the pick-up plug to be inserted in the preform, as this shall be explained in greater detail further on.

In correspondence thereto, the gripping member 3 is shaped so as to provide an appendix 33 having following characteristics:

a) the appendix 33 is capable of being accommodated into a corresponding niche 22;

b) the sizing and the geometry selected for the appendix 33 and the respective niche 22 in relation to each other are such as to allow for a partial rotation of the gripping member 3 about an axis Y that is centered on the niche 22 and substantially orthogonal to both the axis X of the pick-up plug and the radial straight line R joining the center of the niche 22 with the axis X.

In substance, the gripping member 3 is as if it were "hinged on" and constrained to rotate with its own appendix 33 within the respective niche 22, so that no real physical pivot member actually exists, but the instant axis of rotation is determined by the constraint for the appendix 33 to constantly remain inside the respective niche 22.

As far as the spring 4 is concerned, it is quite logically arranged so as to be able to act on to the free side of said gripping member 3; such a contrivance, along with other construction-related solutions, can be easily inferred, without any need for particular explanations, from the illustration in FIG. 3.

Figure 5:
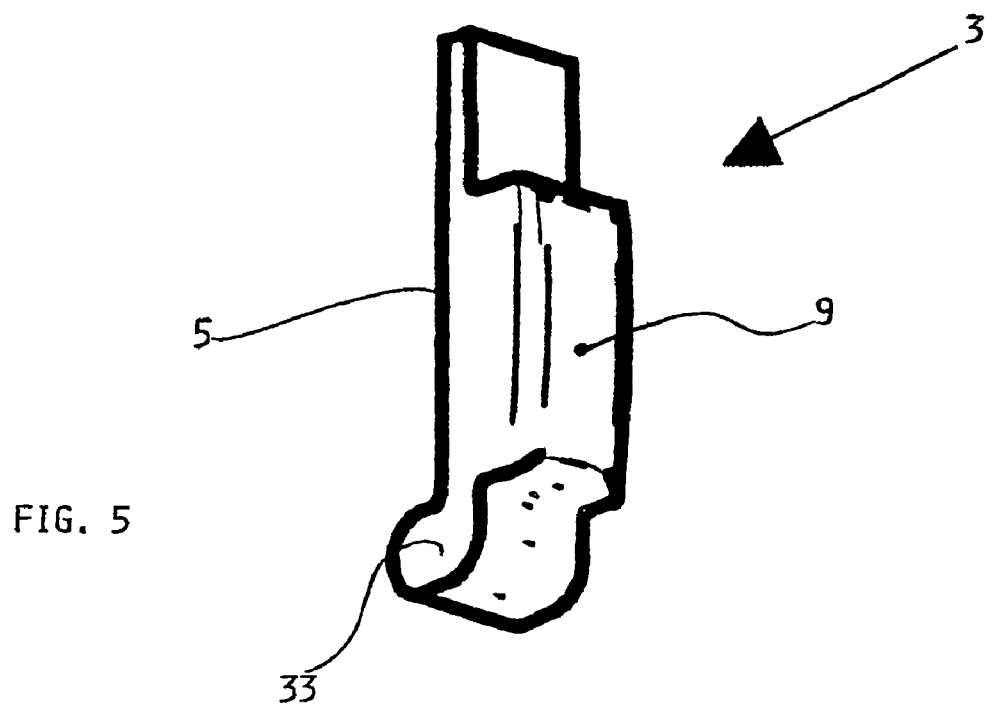
FIG. 5 is a perspective view of a different component part of the pick-up plug illustrated in FIG. 3.
Figure 6:
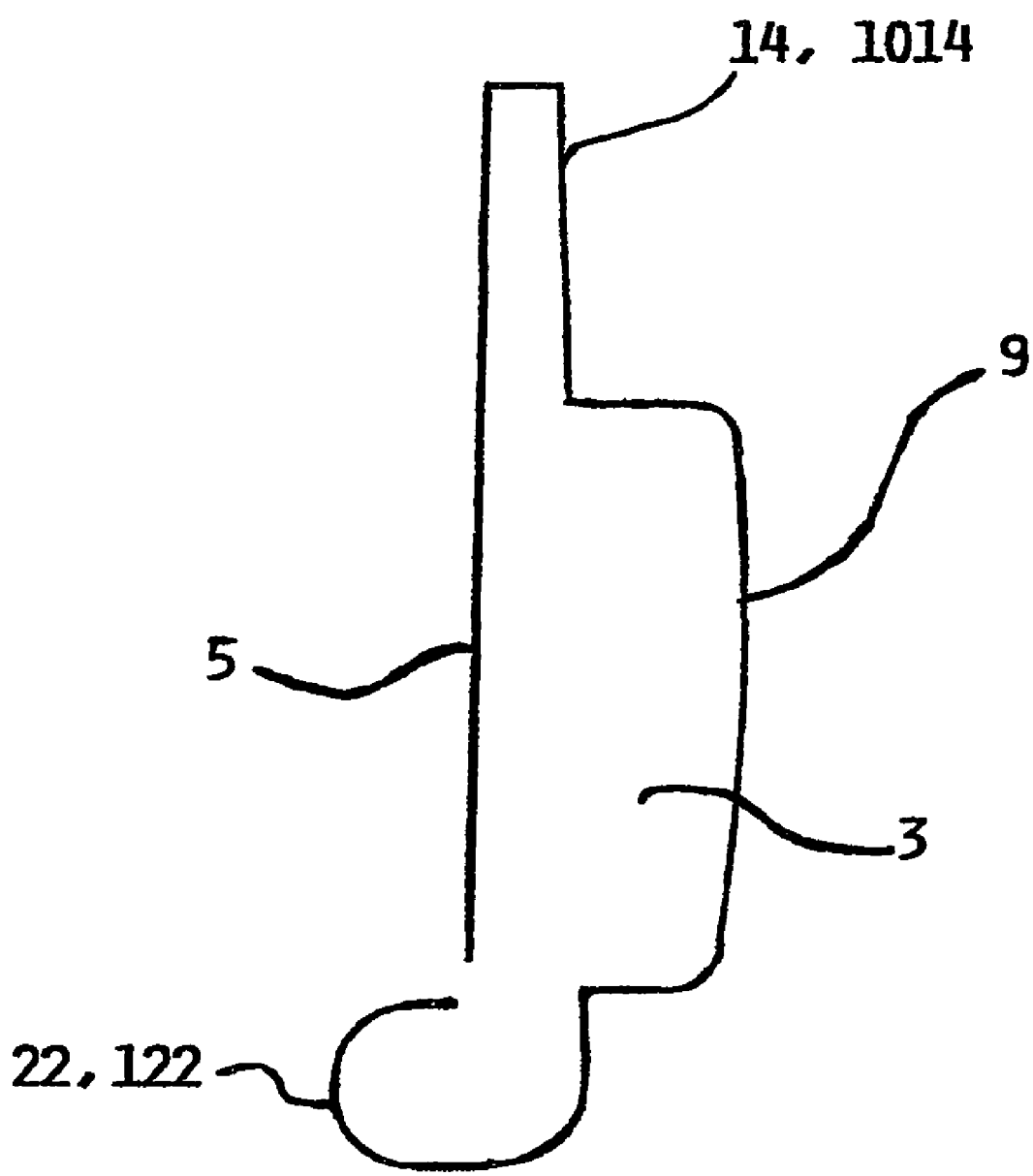
FIG. 6 is a plan side view of the component part illustrated in FIG. 5.

The preferred geometry of the gripping member 3 is illustrated in FIGS. 5 and 6.

Furthermore, in view of attaining the best possible stability of and centering effect in relation to the preform, the groove-like recesses and the respective gripping members shall be at least in the number of three and shall further be preferably distributed in a uniform manner along the outer surface of the pick-up plug.

FIGS. 4a and 4b illustrate the toroidal portion 12 of the pick-up plug, which comprises three groove-like recesses 2 as shown without the related gripping members 3.

As brought about in this manner, the positioning of the axis of rotation of the gripping members 3 with respect to the friction zones of the preforms enables the so-called "harpoon effect" to be appropriately dosed, in the sense of facilitating the insertion of the preform and, on the other hand, hindering it from disengaging and falling off.

Figure 7:
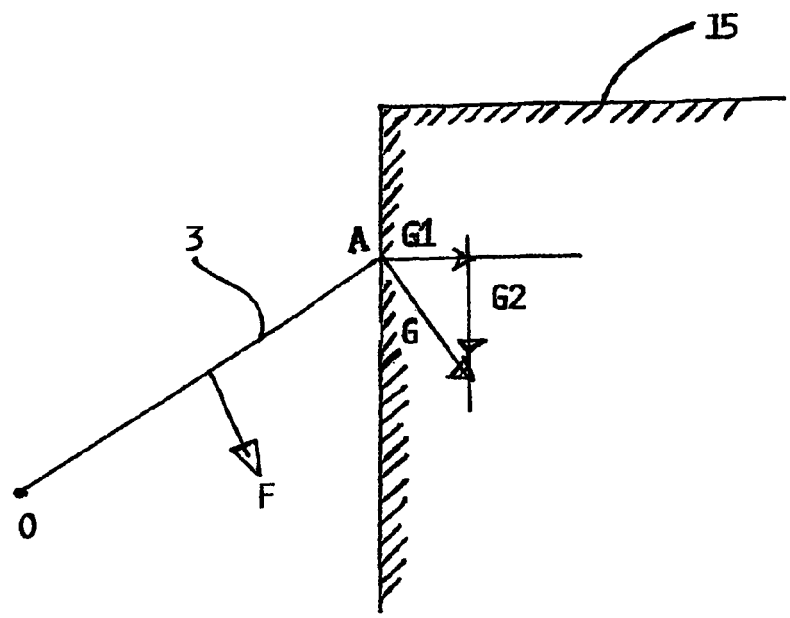
FIG. 7 is a schematized vectorial view of the forces acting on a preform that is firmly applied to a pick-up plug according to the present invention.

In a simplified manner, the above cited "harpoon effect" may be explained as follows: with reference to FIG. 7, the gripping member 3 is represented by the segment OA, the preform is shown by the body 15, and the force acting on the gripping member 3 is the sole torque of rotation F (in fact, no other forces act on the gripping member 3 than those that are totally counterbalanced).

When the preform 15 is standing still, the rotating torque F acts on to the contact point A with a force G, which may be broken down into a force component GI, which is orthogonal to the contact wall 16 of the preform 15, and a tangential force G2, which has of course the same direction as the wall 16 that is so rectilinear.

The force G2 would bring about a vertical displacement of the preform, which would be in turn opposed by a respective friction; however, since the preform is constrained to remain still, such a friction does not come about and the force is necessarily compensated.

Figure 8:
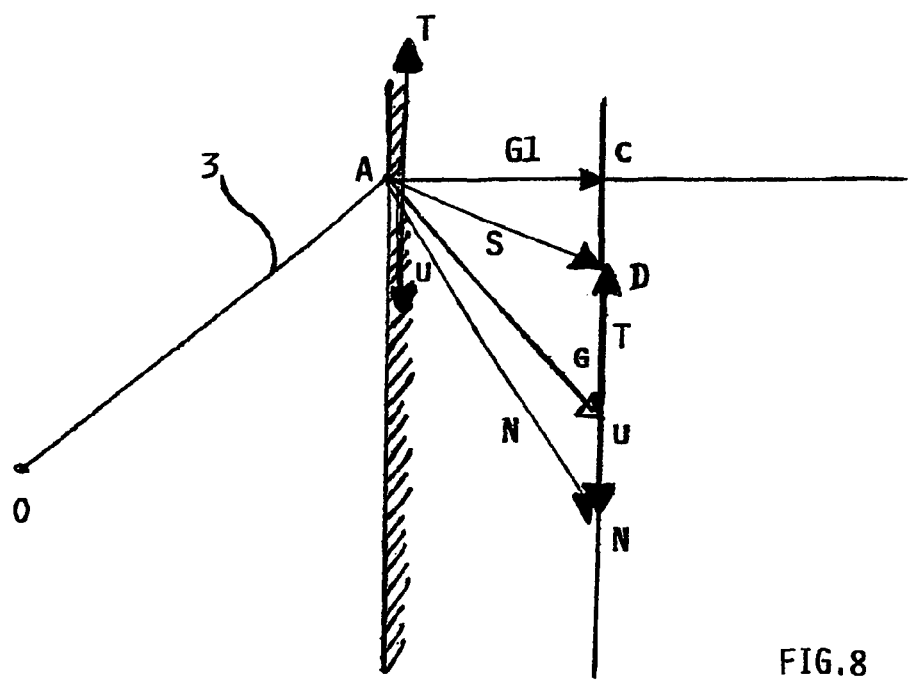
FIG. 8 is a schematized vectorial view of the forces acting on a preform during the phases in which a preform is inserted in and released from a pick-up plug according to the present invention.

When the preform is displaced vertically in the direction of insertion, as this is shown in FIG. 8, on to the point A there is also applied the force T that opposes friction, and, if such a force is brought back to the extreme B of the force vector of the force G, an overall force vector of the forces G and T represented by S, i.e., by the vector of the segment AD, will be obtained.

It can therefore be clearly appreciated that, during the insertion of the preform, the tangential force acting on the preform is given by the segment CD, which is obviously lower than the segment CB.

If the preform is at this point displaced vertically in the direction of disengagement, i.e., release, as this is shown again in FIG. 8, on to the point A there is also applied the force U, that adds up to friction, and if such a force is brought back again to the extreme B of the force vector of the force G, an overall force vector of the two forces G and U represented by Z, i.e., by the vector of the segment AN, will be obtained.

It can therefore be clearly appreciated that, during the release of the preform, the tangential force acting on the preform is given by the segment CN, which is obviously higher than the segment CD.

Anyway, such a "harpoon effect", apart from the explanations of a technical nature that may be given in view of describing the working mechanism thereof, is a universally known fact as continuously verified by common experience.

A further advantageous improvement derives from the fact that the springs 4 are appropriately preloaded in a manner such that the gripping members 3 are permanently forced, i.e., biased into the outermost position, so that all preforms, which can be inserted in the central body of the pick-up plug, are at the same time capable of being engaged by the gripping members 3 with a sensibly constant pressure and, within certain limits, regardless of their inside diameter.

Figure 9:
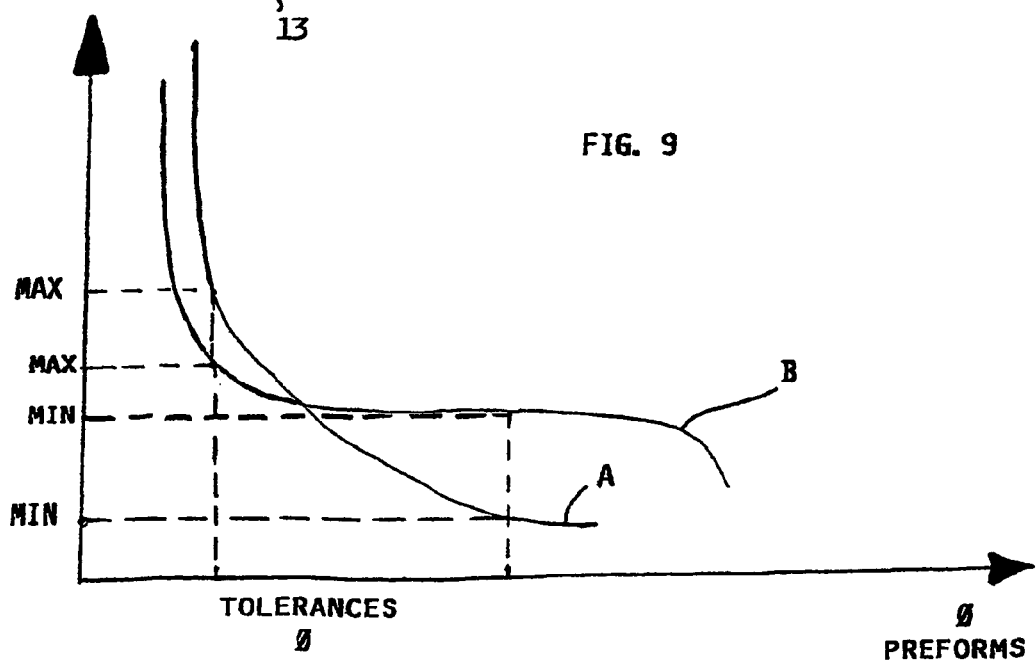
FIG. 9 is a diagrammatical view of two curves representing the characteristic evolution of the values of elastic strength of two elastic members included in the pick-up plug according to the prior art (A) and the present invention (B), respectively.

With reference to the diagram illustrated in FIG. 9, this can be seen to include two curves showing the evolution of the pressure of the gripping member 3 as a function of the inside diameter of a general preform, in which A is used to indicate the curve relating to the case of a non-preloaded spring 4, while B indicates a similar curve referred to the case of a pre-loaded spring: given the minimum and maximum deviations that are actually attainable by said diameter, it can be readily observed that, if the spring 4 is selected in a correct manner with respect to the deviations, the minimum and maximum values, min and max respectively, (curve B) reached by the pressure of the spring 4 are almost constant, and anyway significantly closer to each other, than the minimum and maximum values, MIN and MAX respectively, taken by the pressure of the non-preloaded spring (curve A).

The above described embodiment of the present invention allows for a number of further improvements: it has in fact been observed that the afore mentioned "harpoon effect" can be enhanced if the outer surface 9 of the gripping member 3 is so shaped as to feature a convex curvature towards the outside, as this is best shown in FIG. 6. Furthermore, with reference to FIG. 3, it has similarly been found that, for the purpose of facilitating the insertion of preforms with a minimum inside diameter, it proves suitable for the outer surface 10 of the cylindrical portion of the pick-up plug that is adjacent to the groove-like recesses 2 and opposed to the insertion edge thereof, with respect to the groove-like recesses 2, to be in the shape of a frustum of cone or a flared shape.

A further advantageous embodiment of the present invention consists in providing the individual and independent gripping members 3, 103, at their extremity that is opposed to the respective terminal appendix 33 thereof, with a stop surface 14, 1014 that is adapted to move into abutting, as pushed by the spring 4, against a portion of the surface 10, 1010 of the central body 1, 101; wherein the surface is of course located on the opposite side with respect to the terminal edge 13.

By suitably sizing and shaping the parts involved in the process, this enables the travel and, therefore, the excursion of the gripping member 3 towards the interior or, anyway, towards the neck of the preform to be limited. Such a value may therefore be freely selected so as to ensure that the gripping member 3 protrudes to an adequate extent so as to be able to engage preforms whose neck is small down to a pre-established value, but not so small as to hinder the movement of or damage those preforms whose neck is larger or quite close to maximum value that still enables the preform to be applied to the pick-up plug.

Figure 10:
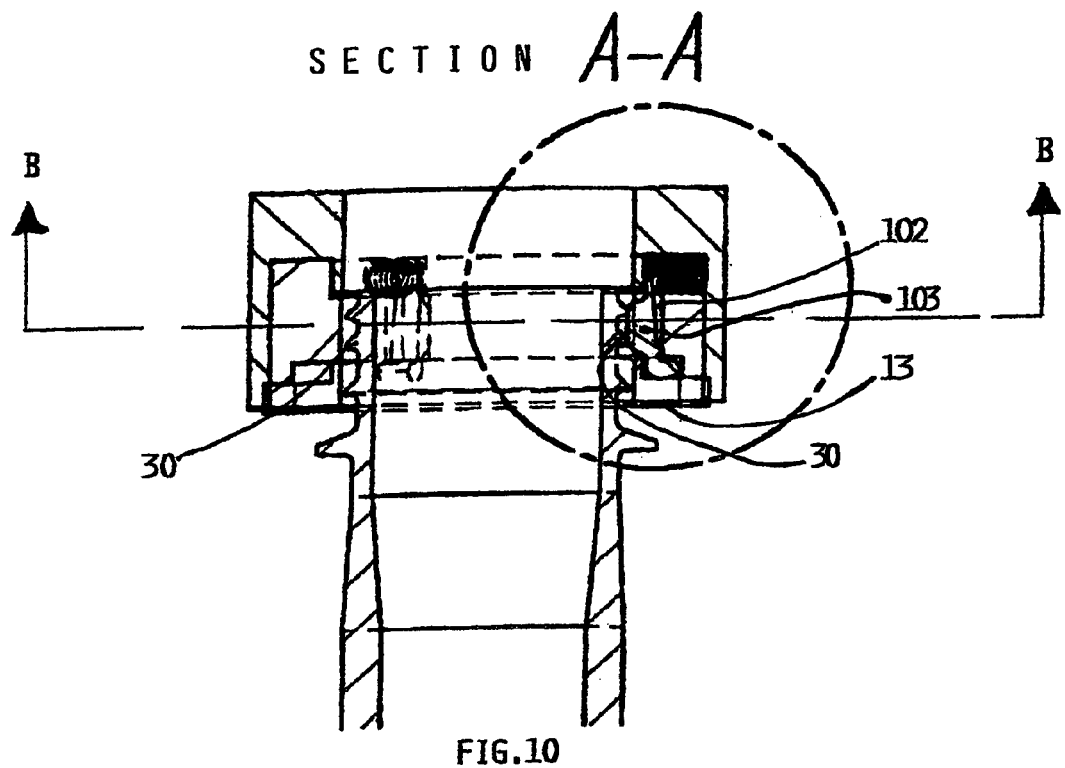
FIG. 10 is a median vertical section, view of an outer-engagement type of pick-up plug according to the present invention.
Figure 12:
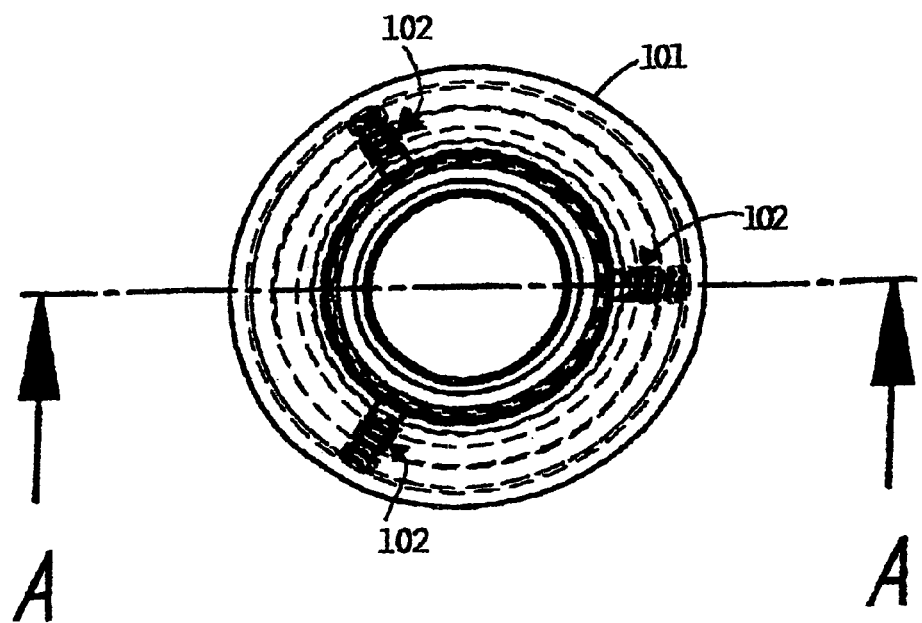
FIG. 12 is a plan section view of the pick-up plug illustrated in FIG. 10, as taken from the section plane B—B that is orthogonal to she axis of the pick-up plug.
Figure 11:
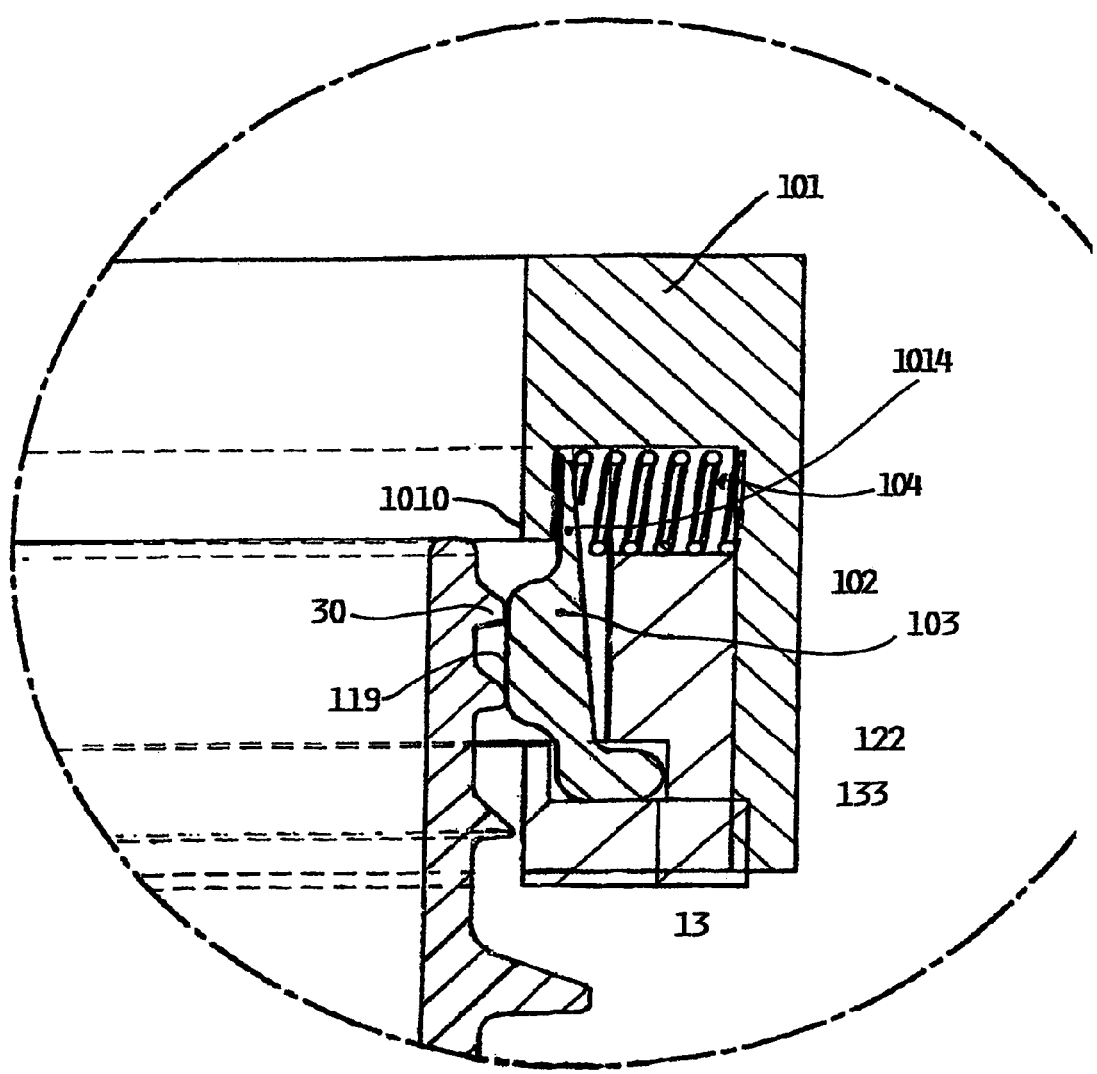
FIG. 11 is an enlarged view of a portion of the pick-up plug illustrated in FIG. 10.

It will be appreciated that all the related manners of construction and the various improvements are capable of being most readily figured out, adapted and implemented by those skilled in the art, who will not find any difficulty in interpreting the related numbering, which is similar to the numbering adopted for the equivalent parts of the preform for inner engagement; with reference to FIGS. 10, 11 and 12, which illustrate a pick-up plug for outer engagement, all considerations set forth above apply in general in an analogous manner, while the fact shall of course be taken into due account that the pick-up plug for outer engagement of the preform is substantially constituted by a central body 101 formed in the shape of an external crown that is provided internally with a cylindrical cavity in which the related preform is inserted and then firmly held.

On the inner cylindrical side of such a crown there are arranged both the groove-like recesses 102 and the gripping members 103, along with the elastic devices 104, in a manner that is substantially symmetrical with respect to what has been described above in connection with the afore considered cases. In fact, in this case both the groove-like recesses 102 and the gripping members 103 are directed inwardly, i.e., towards the interior cavity in which the preform is inserted.

From the illustration in FIG. 11 it can be readily inferred that, in the case of a pick-up plug for outer engagement of the preform, such a pick-up plug obviously engages, with its gripping members 103, corresponding portions of the outer surface of the preform and, as a result, also the related threads 30.

Those skilled in the art will therefore readily understand that the pick-up plug for outer engagement of the preform illustrated in FIGS. 10, 11 and 12 is substantially specular, as far as such functional members and parts as the recesses 102, the gripping members 103, the springs 104, the niches 122 and the related appendices 133, as well as the stop surfaces 1014 are concerned, to a pick-up plug for inner engagement of the preform, e.g., of the type that has been illustrated and described earlier in this specification. As a matter of fact, the pick-up plug is a device comprising surfaces that are provided with appropriate means adapted to exert a controlled pressure against the walls of the neck portion of the preform, wherein such a controlled pressure is produced by the reaction of appropriate springs which, when they act from outside, press against the outer surface of the walls of the neck portion, whereas, when they act from inside, they press against the respective inner surface. If such gripping means are applied from the outside, they are supported in a corresponding carrier member that is generally defined as pick-up plug for outer engagement, or the like. If on the contrary such means are applied from the inside, the respective carrier member is called by the name of pick-up plug for inner engagement, or the like. Anyway, all such means and members may be designed, made and described in an absolutely similar or equivalent manner.

The invention claimed is:

1. An inner-engagement pick-up plug for supporting and transporting a preform of thermoplastic resin, said inner-engagement pick-up plug comprising:
   a central body,
   an engagement mechanism applied to said central body and adapted to engage an inner neck portion of the preform, in which elastic members are provided on said engagement mechanism so as to press said engagement mechanism against a wall of the neck portion,
   wherein said central body is provided with a plurality of groove-like recesses which open towards the surface thereof that is adapted to engage the neck portion of the preform,
   wherein said engagement mechanism comprises individual and independent gripping members that are housed in respective ones of said groove-like recesses,
   wherein said elastic members comprise respective springs acting between the inner wall of respective ones of said groove-like recesses and the corresponding opposed wall of said individual and independent gripping members, and
   wherein said groove-like recesses are provided with a respective niche adapted to accommodate a terminal appendix of a respective one of said individual and independent gripping members, so that the respective terminal appendix is adapted to partially rotate owing to its being pivotally retained in the respective one of said niches.

2. An outer-engagement pick-up plug for supporting and transporting a preform of thermoplastic resin, said outer-engagement pick-up plug comprising:
   a cylindrical hollow central body,
   an engagement mechanism applied to said central body and adapted to engage an upper neck portion of the preform, in which elastic members are provided on said engagement mechanism so as to press said engagement mechanism against a wall of the neck portion,
   wherein said hollow central body is provided with a plurality of groove-like recesses which open towards the surface thereof that is adapted to engage the neck portion of the preform,
   wherein said engagement mechanism comprises individual and independent gripping members that are housed in respective ones of said groove-like recesses,
   wherein said elastic members comprise respective springs acting between the inner wall of respective ones of said groove-like recesses and the corresponding opposed wall of said individual and independent gripping members, and
   wherein said groove-like recesses are provided with a respective niche adapted to accommodate a terminal appendix of a respective one of said individual and independent gripping members, so that the respective terminal appendix is adapted to partially rotate owing to its being pivotally retained in the respective one of said niches.

3. A pick-up plug according to claim 1, wherein there are at least three of said groove-like recesses and said corresponding individual and independent gripping members.

4. A pick-up plug according to claim 1, wherein said elastic members are preloaded, so that said individual and independent gripping members are permanently pushed towards the neck portion of the preform.

5. A pick-up plug according to claim 1, wherein the face of said individual and independent gripping members that looks towards the neck portion of the respective preform has, at least partially, a convex curvature.

6. A pick-up plug according to claim 1, wherein said individual and independent gripping members are provided, at their extremity that is opposed to said respective terminal appendix thereof, with a stop surface that is adapted to be engaged and stopped, at a pre-determined position, by said portion of the outer surface of the central body located on the opposite side with respect to a terminal edge.

7. A pick-up plug according to claim 2, wherein there are at least three of said groove-like recesses and said corresponding individual and independent gripping members.

8. A pick-up plug according to claim 2, wherein said elastic members are preloaded, so that said individual and independent gripping members are permanently pushed towards the neck portion of the preform.

9. A pick-up plug according to claim 2, wherein the face of said individual and independent gripping members that looks towards the neck portion of the respective preform has, at least partially, a convex curvature.

10. A pick-up plug according to claim 2, wherein said individual and independent gripping members are provided, at their extremity that is opposed to said respective terminal appendix thereof, with a stop surface that is adapted to be engaged and stopped, at a pre-determined position, by said portion of the outer surface of the central body located on the opposite side with respect to a terminal edge.

* * * * *